United States Patent
Benden

[19]

[11] Patent Number: 5,915,918
[45] Date of Patent: Jun. 29, 1999

[54] METHOD FOR REDUCING INTERNAL HOT CORROSION IN GAS TURBINE ENGINE COMPONENTS

[75] Inventor: Howard Michael Benden, Glastonbury, Conn.

[73] Assignee: United Technologies Corporation, Hartford, Conn.

[21] Appl. No.: 08/887,590

[22] Filed: Jul. 3, 1997

Related U.S. Application Data

[63] Continuation of application No. 08/414,970, Mar. 31, 1995, abandoned.

[51] Int. Cl.⁶ .................................. F01D 5/18; F01D 9/06
[52] U.S. Cl. ........................ 415/115; 416/97 R; 60/39.75
[58] Field of Search .................................. 415/115, 116, 415/117, 176, 178, 1; 416/90 R, 92, 96 R, 96 A, 97 R, 97 A, 232; 60/39.75

[56] References Cited

U.S. PATENT DOCUMENTS

| | | | |
|---|---|---|---|
| 2,896,907 | 7/1959 | Freche | 416/92 |
| 3,706,508 | 12/1972 | Moskowitz | 416/92 |
| 5,557,922 | 9/1996 | Hoshino et al. | 60/39.75 |

*Primary Examiner*—Christopher Verdier
*Attorney, Agent, or Firm*—Charles E. Sohl

[57] ABSTRACT

Internal hot corrosion which occurs in hollow uncooled gas turbine engine components is reduced by increasing the oxygen potential of the gas which fills the hollow portion of the component. In particular, blades and vanes which operate in conditions where there is a pressure differential across the component have deliberate venting holes introduced in a sealing structure at one end of the component to permit gas flow through the hollow portion of the component.

4 Claims, 1 Drawing Sheet

METHOD FOR REDUCING INTERNAL HOT CORROSION IN GAS TURBINE ENGINE COMPONENTS

This is a continuation application of prior application Ser. No. 08/414,970, filed on Mar. 31, 1995, now abandoned.

TECHNICAL FIELD

The present invention relates generally to a method for reducing internal hot corrosion in gas turbine engine components, and particularly to a method of increasing the oxygen potential in hollow cavities of intentionally uncooled gas turbine engine components.

BACKGROUND INFORMATION

Critical gas contacting elements in a gas turbine engine include blades and vanes. Stationary vanes, disposed between rings of moving blades within the turbine section of the engine direct and stabilize high temperature gas flow from one stage of moving blades to the next.

Gas turbine engine manufacturers are continuously seeking to improve engine efficiency and performance. The demand for greater efficiency requires gas turbine engines to operate at increasingly hotter gas temperatures. Direct exposure to this high temperature gas, however, can detrimentally affect certain turbine airfoils. As a result, cooling mechanisms have been developed to keep the metal temperature of these airfoils within design limits during high temperature operation. Airfoil cooling is typically accomplished by film cooling. In film cooling, cool air is fed through holes in the airfoil wall to form an insulating layer between the hot gases and metal surface.

Improved engine performance is also achieved by reducing engine weight. As a result, it is common practice to use hollow airfoils in portions of the engine that are not exposed to excessively high gas temperatures and thus need not be cooled.

Typical hollow uncooled airfoils are found in the low pressure turbine of modern gas turbine engines. The hollow airfoils are open at one end and sealed at the opposite end. The airfoils are sealed to prevent gas flow through the airfoils since pressure differentials exist which will cause gas flow through the hollow cavities if the airfoils are not sealed. This gas, which is heated, may adversely affect the durability of the adjacent airfoils, and may reduce engine efficiency. For these reasons, it is common practice to either cast the airfoil with a blind cavity or to cast the airfoil with a through cavity and provide a sealing means, such as a cap or cover plate, at one end of the airfoil.

These intentionally uncooled airfoils, however, generally operate at temperatures in which the airfoils are subject to extreme degrees of hot corrosion. Hot corrosion is essentially accelerated oxidation which occurs at relatively low temperatures, between about 1300° F. and about 1800° F. Environmental impurities on the metal airfoil surface, such as sulfur, sodium, vanadium and related compounds, such as sodium sulfate, sodium chloride and vanadium pentoxide, are believed to be major contributors to hot corrosion. The presence of these impurities on the surface of metal alloys prevents the formation of a protective oxide layer, which would normally form in the absence of such impurities. Instead, the impurities act as a flux which disrupts any oxide layer which would normally form on the surface. The lack of protective layer permits diffusion of oxygen through the fluxed surface layer and results in undesirable direct and rapid oxidation of the underlying alloy. This oxidation adversely affects both the exterior and interior portions of the airfoils.

Hot corrosion can be minimized through the application of protective coatings. It is currently common practice to apply protective coatings both on the exterior and interior walls of uncooled airfoils subject to hot corrosion. Typically, an aluminide diffusion coating is applied to the external, as well as internal airfoil walls.

However, this process only reduces hot corrosion by an approximate factor of 3. For example, in one such application it was found that hollow vanes with an uncoated interior had a useful life of about 5,000 hours and that the life was controlled by hot corrosion occurring in the internal blind cavity of the vane. Upon the application of a gas phase diffusion aluminide coating, the useful life of the vane increased to only about 15,000 hours (factor of 3). The exterior of the vane, however, was relatively unaffected by hot corrosion whether it was coated or uncoated.

Accordingly, there exists a need for an effective method of reducing hot corrosion of the internal walls of intentionally uncooled gas turbine engine components.

DISCLOSURE OF THE INVENTION

According to the present invention, a method of reducing hot corrosion of the internal walls of intentionally uncooled gas turbine engine components is disclosed. The method includes controlling the flow of a moderate amount of gas through the hollow cavity of such components.

Specifically, in a gas turbine engine component which is hollow and uncooled, and which has a deliberate flow eliminating element, such as a seal at one end of the component, an aperture is provided in that flow preventing element. The aperture has a cross sectional area ranging from about 0.05% to about 5.0% of average cross sectional area of the cavity, such that a moderate amount of gas will flow through the cavity and reduce hot corrosion without causing other adverse effects.

The gas primarily comprises the products of combustion, which contains a significant amount of free oxygen. I have found that increasing the oxygen potential within the hollow cavities can significantly reduce the extent of hot corrosion. While the typical cross section (in the radial direction) of a hollow cavity in an airfoil ranges from about 0.2 square inches to about 2.0 square inches, the oxygen containing gas flow is limited by providing apertures through the seal on one end of the airfoil. Such apertures are preferably between about 0.001 square inches and about 0.1 square inches and preferably from 0.005 to 0.05 square inches.

The invention will be better understood when considered in light of the following drawings and detailed description of the best mode.

BEST MODE FOR CARRYING OUT THE INVENTION

Figure 1:
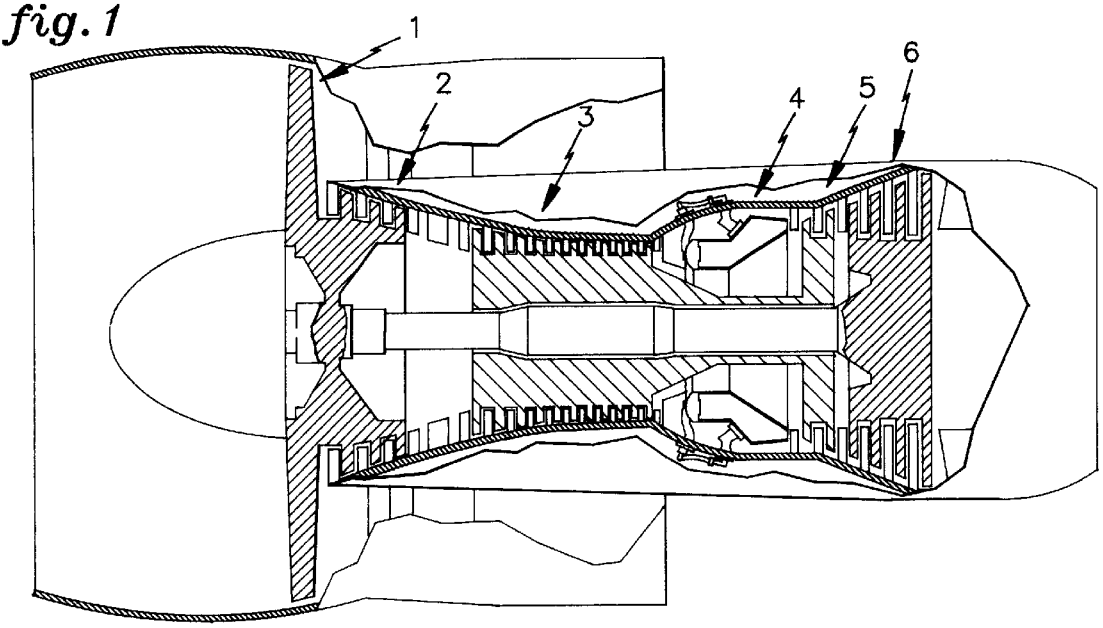
FIG. 1 shows a schematic cross section of a modern high bypass ratio aircraft gas turbine engine.

FIG. 1 is a schematic cross section of a modern high bypass ratio turbo fan engine. In this type of engine air passes through the engine and is compressed, mixed with fuel, burned, and expanded through a turbine which extracts energy from the combusted gas mixture. Referring now to FIG. 1, air flows sequentially through a fan section 1, a low compressor section 2, a high compressor 3, a combustor 4, a high turbine 5, and a low turbine 6.

This invention relates to the blades and vanes in the low turbine section 6. In the low turbine section 6, gas temperatures are low enough so that cooling of the blades and vanes is generally not necessary. Consequently, the blades and vanes do not have intentional air flow through their interior. It is conventional to make such blades and vanes hollow for weight reduction, rather than for cooling.

Figure 2:
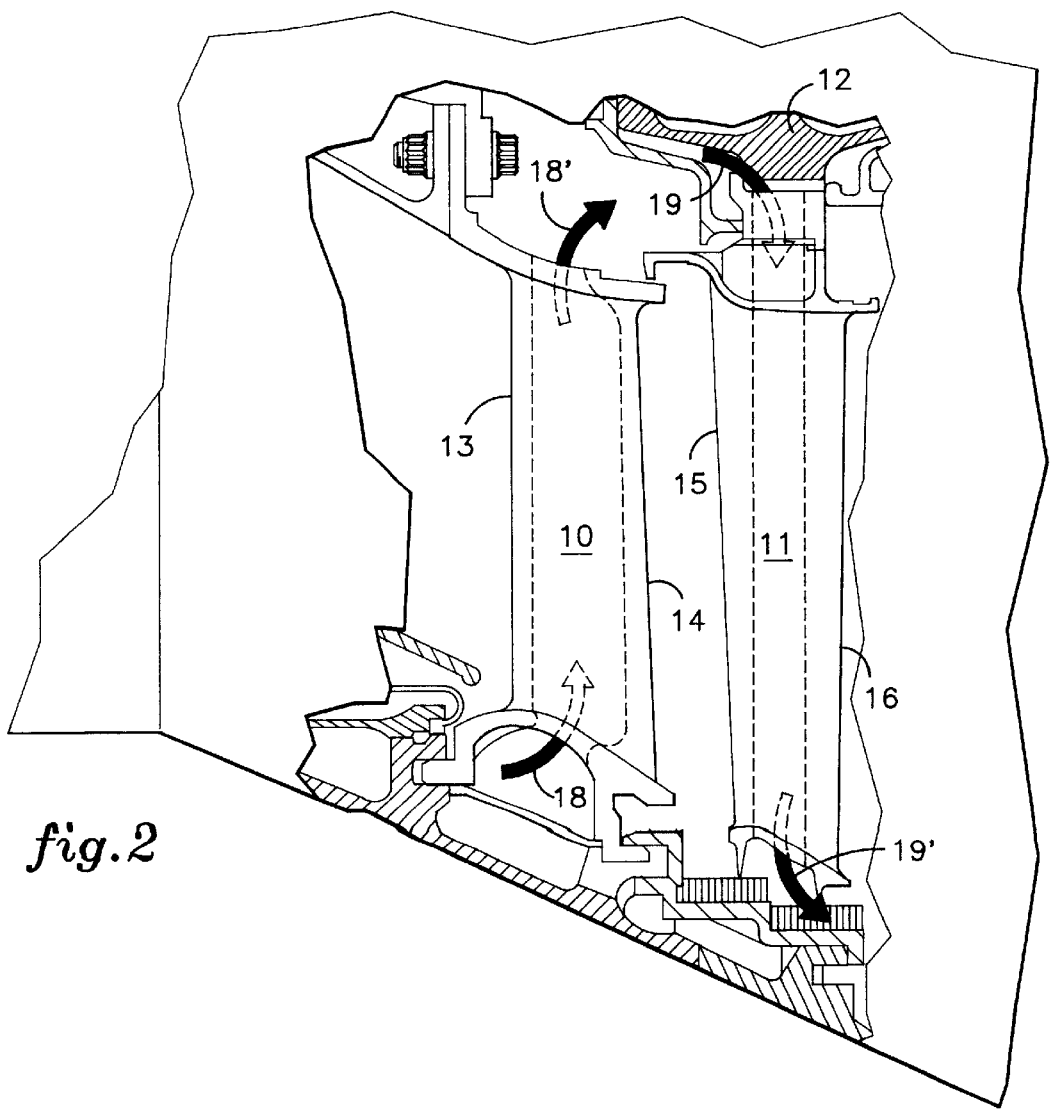
FIG. 2 shows a schematic cross section through a blade and vane in the low turbine section of the engine shown in FIG. 1.

FIG. 2 shows a detailed cross section of a stationary vane 10 and the immediately downstream blade 11 which is mounted on disc 12 and adapted for rotation. In the turbine section the gas expands so that it has a higher temperature and pressure at the leading edge 13 of vane 10 than at the trailing edge 14 of vane 10. Similarly, the temperature and pressure at the leading edge 15 of blade 11 is greater than the gas temperature and pressure at the trailing edge 16 of blade 11.

As previously mentioned, hot corrosion in the interior of components is recognized as a major problem in many gas turbine engines with uncooled hollow blades and vanes. According to the present invention a substantial reduction in hot corrosion in such components is achieved by allowing a small amount of gas to flow through the interior of hollow, uncooled blades and vanes. The effective reduction of hot corrosion is believed to result primarily as a result of the increased oxygen potential within the interior of the blades and vanes and possibly also as a result of the gas carrying with it some contaminants as it exits the blade or vane.

As shown in FIG. 2 by the arrows which enter and exit the hollow cavities of blades and vanes, the general driving force for gas to flow through the hollow blades and vanes is the pressure differential which exists between the leading and trailing edge of these components. Thus, for example, in FIG. 2 with respect to vane 10, arrows 18 and 18' show the direction of air flow. Air generally enters the hollow cavity within blade 10 at a pressure which is approximately equivalent to the pressure existing at the leading edge of that vane and exits at the slightly lower pressure which exists at the trailing edge of vane 10. Similarly with respect to blade 11 air flow is depicted by arrows 19 and 19' and it can be seen that the gas which is shown by arrow 9 enters the hollow cavity in blade 11 at a pressure approximately equivalent to that observed at the leading edge of blade 11 and exits at a lower pressure, reflective of the pressure observed at the trailing edge 16 of blade 11. Thus, for both vane 10 and blade 11 gas passes through the center of the blades largely as a consequence of the pressure differential across the blades. Because the blades rotate during engine operation, centrifugal forces also aid in gas flow through the blades according to the invention.

Whereas it is conventional practice to cast these blades with a continuous cavity extending through the component and then to seal off one end of this continuous cavity to prevent air flow, according to the present invention one or more small holes are deliberately formed in this cover plate or other sealing device to permit a limited controlled amount of gas to pass through the blade or vane. One or more small holes may be employed and it is believed that these holes should have a total cross sectional area ranging from about 0.001 square inches to about 0.1 square inches (and preferably 0.005 to 0.05 sq. in.). The hole dimension may be alternately described as being from about 0.7% to about 4.0% of the average cross section of the hollow cavity in the blade or vane.

In this context it should be noted that the effective cross sectional area of the hollow cavity within these blades is typically between about 0.2 square inches and about 2.0 square inches. According to the present invention, air flow through these cavities is greatly reduced in volume and velocity from that which would be encountered if the blades with merely left in the as cast condition, open at both ends.

What is claimed is:

1. In a gas turbine component which is hollow and uncooled, which has an internal cavity, and which has a deliberate flow eliminating element, to prevent the flow of gas through said hollow component, and which operates in a turbine section of a gas turbine engine, the improvement which comprises:

providing at least one aperture in said flow preventing element, said aperture having a cross sectional area ranging between about 0.7 percent and about 4.0 percent of the average cross sectional area of the cavity, whereby gas will flow through the cavity, the oxygen potential within the cavity will be increased, and hot corrosion will be reduced, wherein said gas is the product of combustion.

2. A method for reducing hot corrosion in a hollow, uncooled gas turbine component wherein said component has a leading edge and a trailing edge, and is mounted in a turbine section of a turbine engine which includes a compressor and a combustor which comprises:

increasing the oxygen content within the hollow component by flowing an oxygen containing gas through the hollow component, wherein said gas is the product of combustion, wherein said gas flows through said component in response to the pressure differential between the leading edge and the trailing edge of said component.

3. A component as in claim 1 wherein said component is elongated and has two end portions, and wherein said internal cavity extends between said end portions, and wherein said gas flows between said end portions through said internal cavity.

4. A component as in claim 1 wherein said component is mounted in the turbine section of a gas turbine engine.

* * * * *